(12) United States Patent
Scheurich

(10) Patent No.: US 8,690,560 B2
(45) Date of Patent: Apr. 8, 2014

(54) EXTRUSION GRANULATOR FOR GRANULATION OF PLASTIC STRANDS

(75) Inventor: Jochen Scheurich, Niedernberg (DE)

(73) Assignee: Rieter Automatik GmbH, Grossostheim (DE)

(*) Notice: Subject to any disclaimer, the term of this patent is extended or adjusted under 35 U.S.C. 154(b) by 33 days.

(21) Appl. No.: 12/664,592

(22) PCT Filed: Jun. 6, 2008

(86) PCT No.: PCT/EP2008/004545
§ 371 (c)(1),
(2), (4) Date: Apr. 22, 2010

(87) PCT Pub. No.: WO2008/151764
PCT Pub. Date: Dec. 18, 2008

(65) Prior Publication Data
US 2010/0203182 A1   Aug. 12, 2010

(30) Foreign Application Priority Data

Jun. 14, 2007 (DE) .......................... 10 2007 027 418

(51) Int. Cl.
*B28B 11/16* (2006.01)
(52) U.S. Cl.
USPC ........... 425/315; 425/307; 425/308; 425/310; 425/337; 425/DIG. 230; 264/143; 264/145
(58) Field of Classification Search
USPC .............. 425/294, 296, 298, 301, 302.1, 307, 425/308, 310, 311, 313, 315, 316, 425/DIG. 230; 264/140, 141, 142, 143, 145
See application file for complete search history.

(56) References Cited

U.S. PATENT DOCUMENTS

| | | | |
|---|---|---|---|
| 2,975,483 A * | 3/1961 | Cooper et al. | 264/143 |
| 3,076,999 A   | 2/1963 | Washburn | |
| 3,651,726 A * | 3/1972 | Laroche | 83/169 |
| 4,025,252 A * | 5/1977 | Hunke | 425/67 |
| 4,180,539 A * | 12/1979 | Clarke | 264/143 |
| 4,340,342 A * | 7/1982 | Kim | 425/72.1 |
| 4,528,157 A * | 7/1985 | Lettner et al. | 264/237 |
| 4,632,752 A * | 12/1986 | Hunke | 210/173 |
| 4,838,775 A * | 6/1989 | Hunke | 425/67 |

(Continued)

FOREIGN PATENT DOCUMENTS

| | | |
|---|---|---|
| DE | 1284613 | 12/1968 |
| DE | 1454750 | 6/1969 |

(Continued)

OTHER PUBLICATIONS

German search report relating to application 10 2007 027 418.3 dated Feb. 27, 2008.

*Primary Examiner* — Seyed Masoud Malekzadeh
(74) *Attorney, Agent, or Firm* — Pillsbury Winthrop Shaw Pittman LLP

(57) ABSTRACT

The invention concerns an extrusion granulator for the granulation of plastic strands gripped by a pair of feed rollers and directed over a slideway in the direction of a cutting rotor with an opposing blade. A guided air stream directed onto the slideway, and deflected perpendicularly towards the cutting rotor by said slideway, impinges on the strands carried on the slideway with such a speed that the strands are held in a parallel orientation by the air stream.

4 Claims, 2 Drawing Sheets

(56) References Cited

U.S. PATENT DOCUMENTS

| | | | |
|---|---|---|---|
| 4,913,899 A * | 4/1990 | Hartig | 425/71 |
| 5,118,270 A * | 6/1992 | Keilert et al. | 425/72.1 |
| 5,146,822 A * | 9/1992 | Noda et al. | 83/22 |
| 5,182,115 A * | 1/1993 | Nogossek et al. | 425/71 |
| 5,242,289 A * | 9/1993 | Forgash et al. | 425/71 |
| 5,265,507 A * | 11/1993 | Noda et al. | 83/22 |
| 5,310,515 A * | 5/1994 | Jurgen et al. | 264/143 |
| 5,545,025 A * | 8/1996 | Tanaka | 425/315 |
| 5,628,947 A * | 5/1997 | Keilert | 264/143 |
| 5,787,604 A * | 8/1998 | Kreuz et al. | 34/384 |
| 6,283,627 B1 | 9/2001 | Fromm | |
| 6,428,298 B1 * | 8/2002 | Clauss et al. | 425/71 |
| 7,638,078 B2 * | 12/2009 | Sasabe et al. | 264/140 |
| 2005/0046069 A1 * | 3/2005 | Sasabe et al. | 264/140 |

FOREIGN PATENT DOCUMENTS

| | | |
|---|---|---|
| DE | 4338032 A1 | 5/1995 |
| DE | 69023410 | 4/1996 |
| DE | 4439774 A1 | 5/1996 |
| DE | 19728661 A1 | 1/1999 |
| DE | 19931222 A1 | 1/2011 |
| EP | 1066938 | 7/2000 |
| JP | 03207609 A | 10/1991 |

* cited by examiner

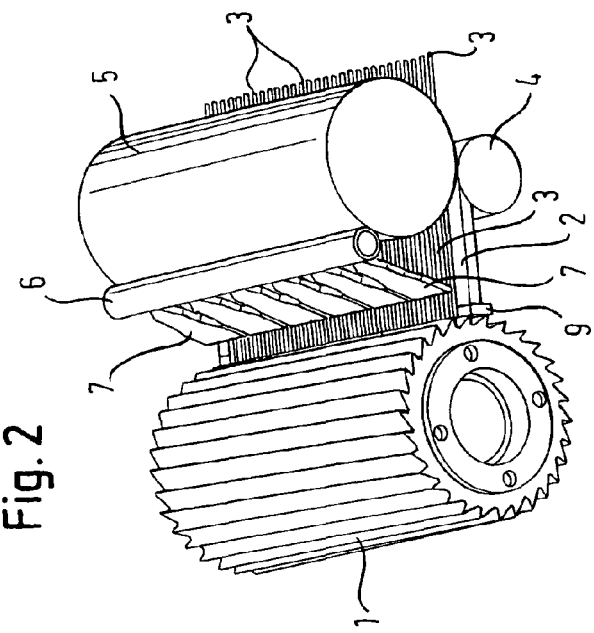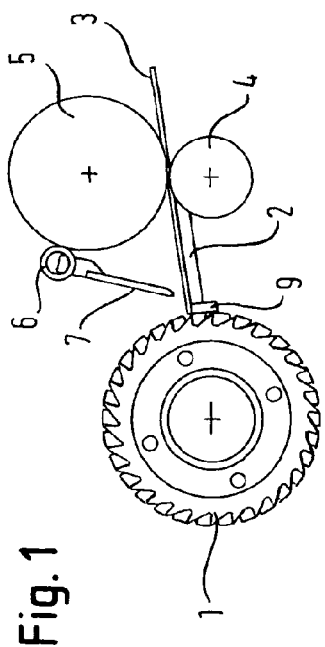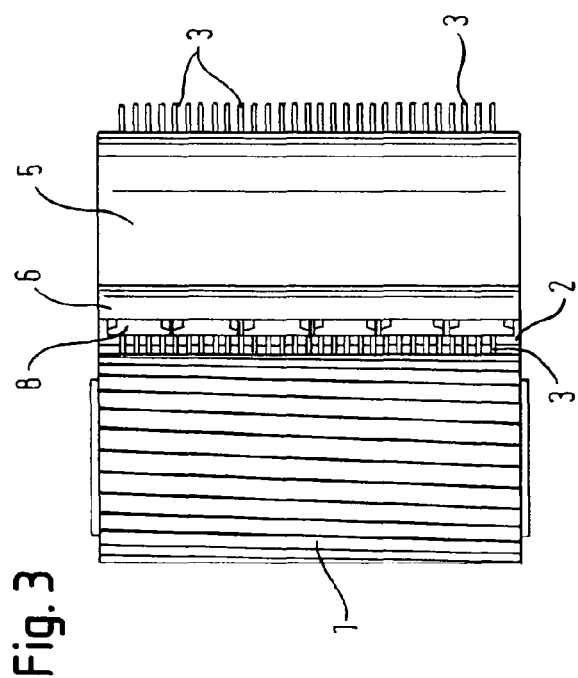

EXTRUSION GRANULATOR FOR GRANULATION OF PLASTIC STRANDS

CROSS REFERENCE TO RELATED APPLICATIONS

This application is a U.S. National phase of International Application No. PCT/EP2008/004545, filed Jun. 6, 2008, which in turn claims priority to German Patent Application No. 10 2007 027 418.3, filed on Jun. 14, 2007. The contents of which are incorporated herein by reference in its entirety.

The invention relates to an extrusion granulator for granulating plastic strands, which are gripped by a pair of feed rollers and are conveyed over a slideway in the direction of a cutting rotor with an opposing blade.

With extrusion granulators of this type there exists the problem that the strands conveyed adjacent to one another over the slideway without lateral guidance tend to approach one another and stick together or even form clumps in the process, which then results in a correspondingly nonuniform and thus unusable granulate. A variety of proposals have already been made to address this problem. Thus, DE OS 1454750 proposes to guide the strands between a continuous, driven conveyor belt and the slideway located thereunder. Two belt drive rollers are provided for the conveyor belt, with the drive roller nearest the cutting rotor simultaneously serving as a feed roller. This conveyor belt with its drive entails a considerable degree of effort, in which it is also necessary to take into account the fact that the spacing between the conveyor belt and slideway must be individually set in each case for strands of different thicknesses.

Another proposal for the reliable guidance of multiple adjacent strands conveyed over the slideway is described in DE AS 1284613, where a specially designed slideway is disclosed that is provided with a plurality of parallel guide grooves (see col. 5, lines 19/20 therein). In the event of strands with different thicknesses, such an arrangement prevents them from being conveyed in greater or lesser numbers across the width of the slideway, which correspondingly reduces the flexibility of operation of the relevant extrusion granulator.

Lastly, reference is made to DE 69023410 T2, where horizontal and vertical vibration of the strands can be minimized in an extrusion granulator of the type discussed here by spraying a fluid onto the strands from above a slideway. This design requires a considerable quantity of the fluid with corresponding drainage, and if applicable recirculation, of the fluid so that it can actually be effective; moreover, the fluid must be chosen such that it does not adversely affect the chemistry of the strands.

The object if the invention is to ensure a reliable guidance of the strands on the slideway with a technically simple, low-cost design, without there being a risk of exposing the strands to influences that adversely affect their chemical composition in any way. This is accomplished according to the invention in that an air stream directed onto the slideway behind the feed rollers and deflected perpendicularly towards the cutting roller by said slideway impinges on the strands carried by the slideway with such a speed that that the strands are held in a parallel orientation by the air stream.

The air required for producing the air stream is available in any desired quantity for use in the extrusion granulator. It is also particularly well suited for holding the strands with uniform spacing in a parallel orientation guided perpendicular to the cutting rotor, since the air stream can be produced with any desired speed with any known ventilation device and can also be directed onto the strands perpendicular to the transverse direction of the slideway and the cutting rotor, so that it is possible to subject the strands to equal pressure from both sides and, if applicable, to force them into the perpendicular position, something which may be necessary with an unguided length of the strands on the slideway and because of a corresponding effect of the cutting rotor, which can exert a lateral displacement force on the strands—namely on account of a customary slight helical orientation of its teeth—which would then result in an undesired angled cut of the granulate, which is avoided by the inventively enforced parallel and perpendicular guidance of the strands.

It is possible to provide multiple individual nozzles adjacent to one another to supply the air stream above the slideway, each of which nozzles directs its own air jet onto the slideway, with the nozzles being arranged adjacent to one another such that overall, an essentially uniform air stream results in front of the slideway.

However, it is also possible to provide a slot nozzle to supply the air stream above the slideway, whence a thin air stream extending over the entire width of the slideway is forced.

Example embodiments are shown in the drawings, in which:

FIG. 1 shows a schematic representation of an extrusion granulator with slideway and feed rollers with an individual nozzle, in a side view;

FIG. 2 shows the same arrangement in a perspective view from above, with individual nozzles arranged adjacent to one another;

FIG. 3 shows the arrangement from FIG. 1 in a view from above, with a slot nozzle;

Figure 4:
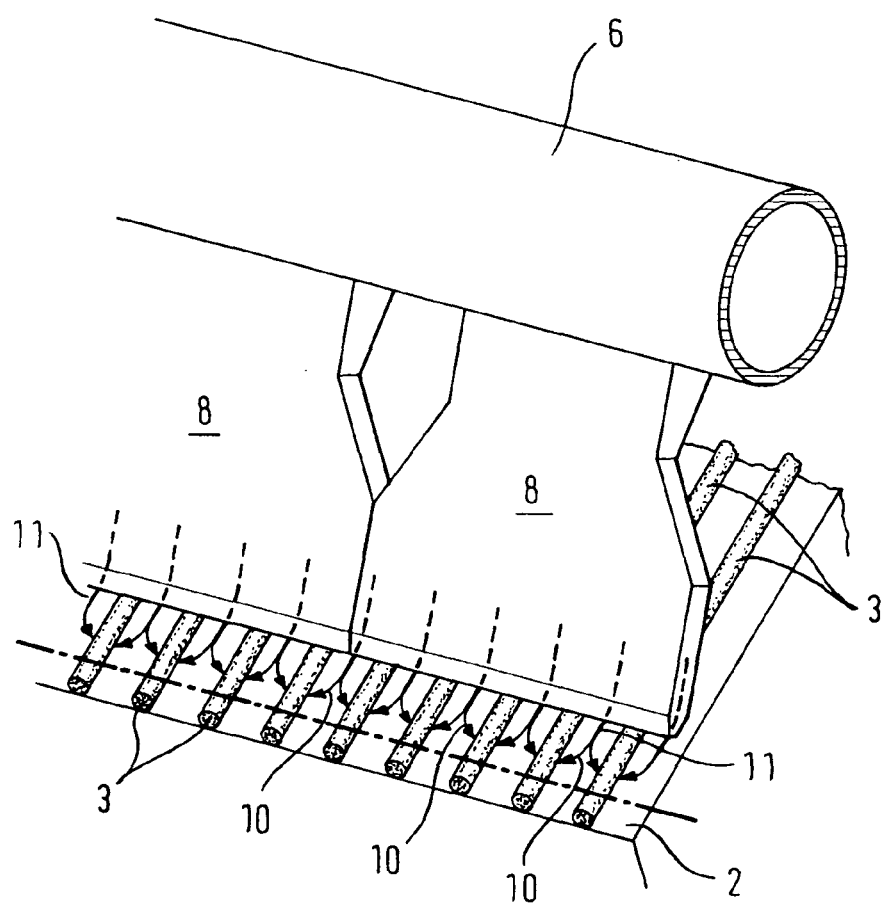
FIG. 4 shows a perspective view of individual nozzles and the strands guided over the slideway, with a representation of the air flow.

The extrusion granulator shown schematically in a side view in FIG. 1 includes the cutting rotor 1, onto which the slideway 2 is directed. Conveyed to the cutting rotor 1 via the slideway are a plurality of plastic strands 3, which are gripped by the feed rollers 4 and 5 ahead of the slideway 2 and pushed towards the cutting rotor 1 and opposing blade 9 over the slideway 2. To this extent, this is an embodiment according to the prior art.

Arranged above the slideway 2 is the air supply duct 6, off of which branch the individual nozzles 7 (see also FIG. 2), through each of which an air stream supplied to the air supply duct 6 is directed in a slightly inclined direction onto the slideway 2 and thus onto the plastic strands carried thereby. As is evident, the nozzles 7 end only a short distance above the slideway 2 (e.g., 1 to 3 cm), by which means the air stream from the slideway 2 is directed uniformly on the individual plastic strands and, above all, on their intervening spaces, in a perpendicular direction toward the cutting rotor, by which means, proceeding from the air stream forced into the intervening spaces, the individual plastic strands are reliably kept laterally spaced apart, since when two adjacent plastic strands approach one another the resultant decreased intervening space between the plastic strands causes a corresponding increase in the pressure between the plastic strands, so that they are repeatedly returned to their original position in the perpendicular direction where the spacings of the plastic strands are equal, which automatically achieves a pressure effect across the plastic strands that is compensating with regard to their spacing.

FIG. 2 reproduces, in a perspective top view, the arrangement shown as a side view in FIG. 1. Connected to the air supply duct 6 are multiple individual nozzles 7 arranged parallel and adjacent to one another, whence the air stream delivered in each case through the air supply duct 6 impinges on the strands 3 from above and at an angle, and ensures their uniform distribution over the slideway 2. In this regard, the individual nozzles are arranged adjacent to one another in such a manner that an essentially uniform air stream results with regard to the strands 3.

FIG. 3 shows a top view of a variation of the design from FIG. 1 and FIG. 2. According to FIG. 3, there is connected to the air supply duct 6 a slot nozzle 8 extending across the slideway 2, which nozzle to a certain extent represents a combination of the individual nozzles 7 from FIG. 2. From this slot nozzle emerges—in a manner similar to the arrangement from FIG. 2—a thin air stream that is aimed as is shown in FIG. 1 and that thus securely holds the individual strands 3 in their enforced position perpendicular to the feed rollers 4 and 5, which then results in the desired uniform, right-angle-cut granulate. The slot nozzle 8 represents a simplification of design relative to the embodiment from FIG. 2.

FIG. 4 shows a perspective view of the part of the inventive extrusion granulator relating to the air flow. Connected to the air supply duct 6 are the individual nozzles 8 extending over the entire width of the slideway 2, which nozzles guide an air stream emerging from said air supply duct that is split by the individual strands 3 into a corresponding number of individual air streams 11, which initially flow parallel to one another and perpendicularly toward the cutting rotor (cutting rotor 1 in FIG. 3). The direction of the teeth of the cutting rotor and the opposing blade (cutting rotor 1 and opposing blade 9 in FIGS. 1 and 2) are indicated as a dotted/dashed line in FIG. 4. The action of the individual air streams 11 on the strands 3 is represented by the deflections 10 of the individual air streams 11 oriented laterally toward the strands 3, by which the effect on the direction of the strands 3 is accomplished by the means that, as a result of the uniform pressure on both sides of the strands 3, they are carried perpendicularly away from the individual nozzles 8 in the direction of the cutting rotor. The necessary orienting force acting on the strands 3 in each case is determined by the speed of the individual air streams 11, which is easily set in a known manner (adjustable pressure in the air supply duct 6). The strands 3 are thus securely guided perpendicularly to the opposing blade 9 and to the cutting rotor 1, so that a granulate that is cut at right angles can be ensured with this device.

The invention claimed is:

1. An extrusion granulator comprising:
a pair of feed rollers configured to grip strands and to feed the strands in a feeding direction,
a slideway configured to convey strands having an unguided length on the slideway from the feed rollers to a cutting rotor having an opposing blade, and
an air stream ejecting source configured to create an air jet stream directed onto the slideway downstream of the feed rollers and upstream of the cutting rotor,
wherein the air jet stream is deflected by said slideway perpendicularly towards the cutting roller and sideways to the feeding direction to result in a deflected air jet stream that impinges said sideways on the strands carried by the slideway with such a speed the strands are held in a parallel orientation by the deflected air jet stream,
wherein the air stream ejecting source comprises multiple individual nozzles adjacent to one another and arranged in a first direction perpendicular to the feeding direction to supply the air jet stream from above to the slideway, and wherein each of the nozzles directs the air jet stream onto the slideway, and
wherein the extrusion granulator is configured to hold the strands with uniform spacing in a parallel orientation guided perpendicular to the cutting roller.

2. An extrusion granulator comprising:
a pair of feed rollers configured to grip strands and to feed the strands in a feeding direction,
a slideway configured to convey strands having an unguided length on the slideway from the feed rollers to a cutting rotor having an opposing blade,
an air stream ejecting source configured to create an air jet stream directed onto the slideway downstream of the feed rollers and upstream of the cutting rotor,
wherein the air jet stream is deflected perpendicularly to the feeding direction by said slideway to result in a deflected air jet stream that sideways impinges on the strands carried by the slideway with such a speed that the strands are held in a parallel orientation by the deflected air jet stream,
wherein the air stream ejecting source comprising a plurality of slot nozzles arranged in a direction perpendicular to the feeding direction to supply the air jet stream above the slideway and to direct the air jet stream onto the slideway, and
wherein the plurality of slot nozzles are provided to supply the air stream above the slideway.

3. The extrusion granulator of claim 1, wherein the unguided length of the strands on the slideway is such that a readjustment of the strands parallel to each other and perpendicular to the cutting edge is performed by the air jet stream.

4. The extrusion granulator of claim 2, wherein the unguided length of the strands on the slideway is such that a readjustment of the strands parallel to each other and perpendicular to the cutting edge is performed by the air jet stream.

* * * * *